UNITED STATES PATENT OFFICE.

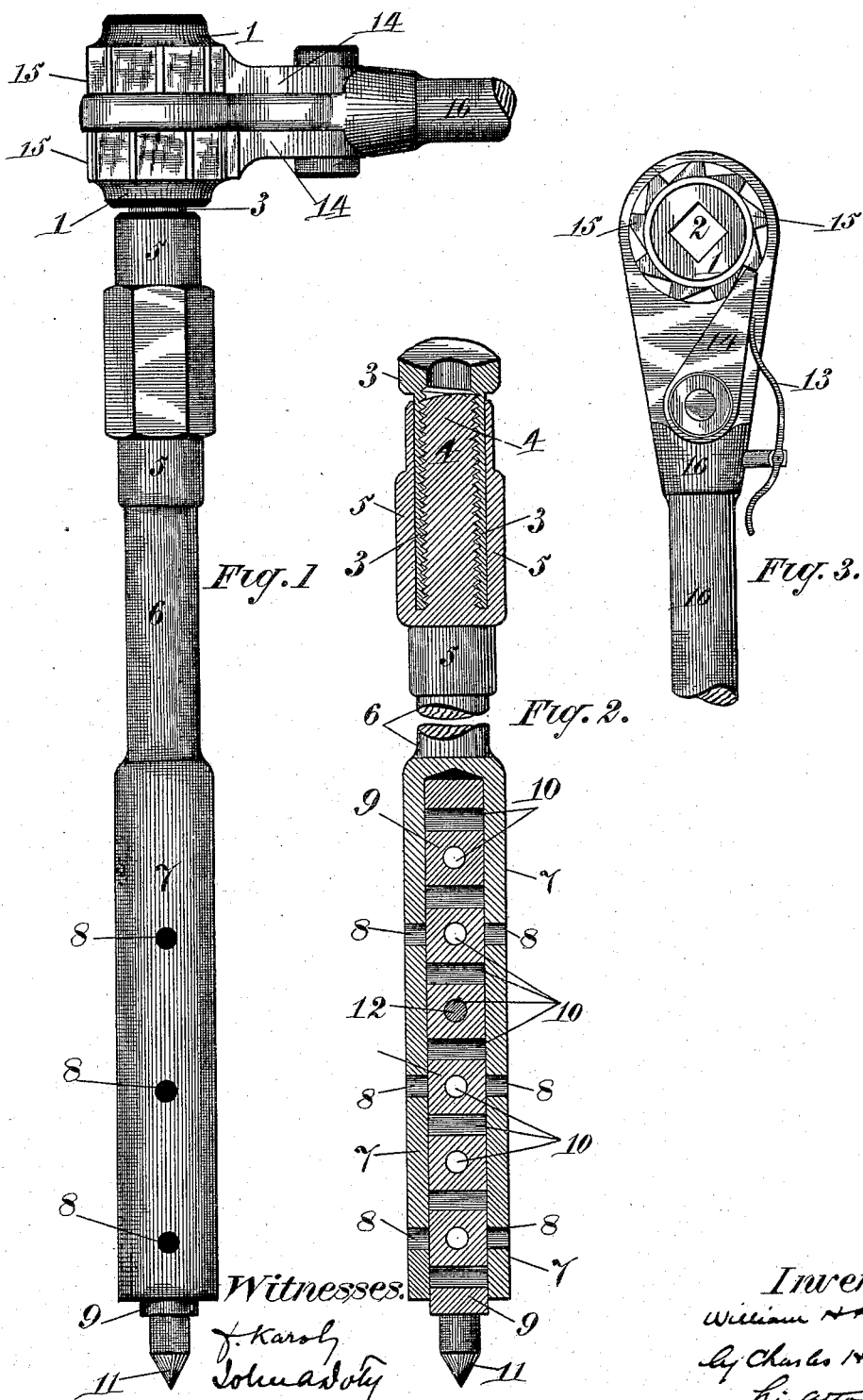

WILLIAM H. HEESON, OF TORONTO, CANADA.

SELF-FEEDING RATCHET-BRACE FOR HAND-DRILLING PURPOSES, &c.

SPECIFICATION forming part of Letters Patent No. 493,717, dated March 21, 1893.

Application filed May 13, 1892. Serial No. 432,862. (No model.)

*To all whom it may concern:*

Be it known that I, WILLIAM HENRY HEESON, engineer, of the city of Toronto, county of York, Province of Ontario, Canada, have invented certain new and useful Improvements in Self-Feeding Ratchet-Braces for Hand-Drilling Purposes; and I hereby declare the following to be a full, clear, and exact description of the same.

Heretofore self-feeding-ratchet-braces consisted of a body having a recess formed in one end to receive the shank of the drill or other tool employed, and had formed at the other end a means for securing thereto the pointed end serving as a pivot and around which the said body revolved,—this pointed end was always of a fixed length and when the brace was placed to bring the point of the drill or other tool into engagement with the work it was found necessary in innumerable instances to build up a firm abutting surface for the said pointed end to enable the brace to obtain the required pressure and force and this invention relates to a means by which the pointed end may be extended or contracted to any desired length and thus entirely dispense with the necessity of building up the aforesaid abutting surface, and the object of the invention is to so construct the pointed end that it can be readily extended or contracted to bring it into engagement with the aforesaid surface to give to the brace the required pressure and force to enable the tool to successfully perform its work during its forward rotation, and the invention consists essentially of a self-feeding-ratchet-brace comprised of a body in one end of which is formed a recess to receive the shank of the drill or tool employed, a lever pivoted upon the said body and adapted to rotate there around, one or more pawls connected to the said lever and adapted to engage with the toothed portions of the said body so that the forward movement of the said lever will rotate the said body, a means formed at the other end of the said body for securing thereto the pointed end, the pointed end in this instance comprising a sleeve of any suitable length and a metallic bar to slide within the said sleeve, said metallic bar having one or both its ends pointed and means for adjustably locking together said sleeve and bar, the whole device being constructed and arranged as hereinafter more fully set forth in the specification and more particularly pointed out in the claim.

In the drawings:—Figure 1 is a plan view of a self-feeding-ratchet-brace for hand drilling purposes showing my device attached thereto. Fig. 2 is a transverse sectional view on the lines $a-a$ Fig. 1. Fig. 3 is an end elevation.

Like figures of reference refer to like parts throughout the specification and drawings.

The brace consists of a body 1, having formed at one end a recess 2, to receive the shank of the drill or other tool employed in the work and having connected to its other end a sleeve 3 screw threaded on its inner face to receive a screw 4 and located centrally in an outer sleeve 5. The outer end of the outer sleeve 5 is extended to form a shank 6 and sleeve 7.

Formed in the sleeve 7 is a series of holes 8 passing diametrically through the said sleeve. Sliding within the sleeve 7 is the metallic bar 9 having one or both its ends pointed. This bar 9 is provided with a series of holes 10 passing diametrically through it and corresponding in diameter to the holes 8 in the sleeve 7. The sleeve 7 and metallic bar 9 are each of a suitable and predetermined length and the holes 8 and 10 respectively in the sleeve 7 and metallic bar 9, are preferably arranged at points equi-distant from each other. By sliding the metallic bar 9 into the sleeve 7 until the pointed end 11 of the said metallic bar projects but slightly beyond the end of the said sleeve the device is contracted to its utmost extent, a pin 12 being passed through the holes 8 and 10 locks rigidly together the said metallic bar and sleeve. By sliding the metallic bar 9 out of the sleeve 7 until the last hole 10 in the said metallic bar comes opposite the last hole 8 in the sleeve 7 the said device is extended to its fullest extent, and a pin 12 is passed through the holes 8 and 10 as before to lock rigidly together the said sleeve and metallic bar. By the arrangement of intermediate holes formed through the said metallic bar 9 it is possible to adjust the said metallic bar to any desired length between its fullest extended and contracted length. By a device of this kind it is possible to entirely dispense with the necessity of building up an abutting surface which has hitherto been required to be done when the pointed end of the brace would not extend or could not be extended to a firm abutting surface.

It is also my intention to place a spring 13 at the back of each of the pawls 14 in such a manner that the pressure of the spring 13 can be removed from the said pawls 14 and the pawls 14 can be lifted into the position shown in Fig. 3 of the drawings to enable the operator of the brace to lift the dogs out of engagement with the ratchet teeth 15 formed on the body 1 to permit of the body being turned in any desired direction. A spring of less pressure if desired may be connected to the lever 16 below the pawls 14 in such a manner as to hold the said pawls out of engagement with the ratchet teeth 15 until the pressure of the spring is again placed upon them. The lever 16 is pivoted to the body 1 in such a manner as to rotate there around. It is possible by throwing the pawls 14 out of engagement with the ratchet teeth 15 to use a tap or die in the brace, as the said tap or die can be turned in the reverse direction to remove it from engagement with the work after the desired thread has been cut.

Having thus fully described my invention, what I claim as new, and desire to secure by Letters Patent, is—

A self-feeding ratchet-brace composed of a body 1, having formed at one end a recess 2 to receive the shank of the drill or other tool and having at its other end a sleeve 3 screw-threaded on its inner face in combination with the sleeve 5 provided with a screw 4 at one end located centrally within the shell of the sleeve 5, said screw adapted to mesh with the screw-threaded portion of the sleeve 3 the opposite end of the sleeve 5 extended to form a shank 6 sleeve 7, a metallic bar 9 adapted to slide within the sleeve 7 and provided with a pointed end 11 to serve as a pivot, said metallic bar 9 having a series of apertures 10 therein through which and through apertures 8 formed in the sleeve 7 are adapted to pass, a locking pin, a lever 16 adapted to rotate around the body 1, ratchet teeth 15 on the body 1, pawls 14 meshing with the teeth 15, a spring 13 pivoted to a standard 15$^a$ secured to the lever 16, said spring adapted to bear on the back of the pawls 14 and force the said pawls into engagement with the teeth 15, said springs adapted to be turned on their said pivots, substantially as described.

Toronto, April 27, 1892.

WM. H. HEESON.

In presence of—
M. E. ANGELL,
CHAS. H. RICHES.